United States Patent
Zwinger et al.

(10) Patent No.: US 8,457,913 B2
(45) Date of Patent: Jun. 4, 2013

(54) COMPUTER SYSTEM WITH INTEGRATED ELECTROMAGNETIC-INTERFERENCE DETECTORS

(75) Inventors: Steven F. Zwinger, Poway, CA (US); Kenny C. Gross, San Diego, CA (US); Aleksey M. Urmanov, San Diego, CA (US)

(73) Assignee: Oracle America, Inc., Redwood Shores, CA (US)

( * ) Notice: Subject to any disclaimer, the term of this patent is extended or adjusted under 35 U.S.C. 154(b) by 793 days.

(21) Appl. No.: 12/132,878

(22) Filed: Jun. 4, 2008

(65) Prior Publication Data

US 2009/0306920 A1    Dec. 10, 2009

(51) Int. Cl.
*G01R 23/16* (2006.01)
(52) U.S. Cl.
USPC .......... 702/77; 702/60; 702/64; 702/81
(58) Field of Classification Search
USPC ...... 702/60, 64, 77, 81; 361/818; 324/750.27, 324/754.27, 754.29
See application file for complete search history.

(56) References Cited

U.S. PATENT DOCUMENTS

| | | | | |
|---|---|---|---|---|
| 5,514,971 | A * | 5/1996 | Hankui et al. | 324/639 |
| 7,222,033 | B1 * | 5/2007 | Newson et al. | 702/65 |
| 2007/0233405 | A1 * | 10/2007 | Izumi | 702/57 |

OTHER PUBLICATIONS

Cheng et al., 'Multivariate State Estimation Technique for Remaining Useful Life Prediction of Electronic Products', 2007, UMD Article, pp. 1-7.*
Doallo-Biempica et al., 'Evaluation of vectrorization/parallelization techniques: application to nonparameteric curve estimation', 1996, Statistics and Computing, pp. 347-351.*

* cited by examiner

*Primary Examiner* — Elias Desta
(74) *Attorney, Agent, or Firm* — Park, Vaughan, Fleming & Dowler, LLP; Steven E. Stupp (57) ABSTRACT

Embodiments of a system that determines a condition associated with an integrated circuit disposed on a circuit board are described. During operation, the system receives electromagnetic-interference (EMI) signals from one or more antennas while the integrated circuit is operating, where the one or more antennas are disposed on the circuit board. Then, the system analyzes the received EMI signals to determine the condition.

20 Claims, 6 Drawing Sheets

| TIME STAMP(S) 512-1 | ANTENNA(S) 514-1 | RECEIVED EMI SIGNALS 516-1 |
|---|---|---|
| TIME STAMP(S) 512-2 | ANTENNA(S) 514-2 | RECEIVED EMI SIGNALS 516-2 |

ELECTROMAGNETIC-INTERFERENCE (EMI) SIGNALS 510-1
ELECTROMAGNETIC-INTERFERENCE (EMI) SIGNALS 510-2
...

| ANTENNAS 612-1 / VARIABLES 618-1 | RELATIONSHIPS 614-1 | PARAMETERS 616-1 |
|---|---|---|

INFERENTIAL MODEL 610-1
INFERENTIAL MODEL 610-2
...

COMPUTER SYSTEM WITH INTEGRATED ELECTROMAGNETIC-INTERFERENCE DETECTORS

RELATED APPLICATIONS

This application is related to: (1) a pending U.S. patent application entitled "Accurately Inferring Physical Variable Values Associated With Operation of a Computer System," by Ramakrishna C. Dhanekula, Kenny C. Gross, and Aleksey M. Urmanov, having Ser. No. 12/001,369, and filing date Dec. 10, 2007, (2) to a pending U.S. patent application entitled "Proactive Detection of Metal Whiskers in Computer Systems," by Ramakrishna C. Dhanekula, Kenny C. Gross, and David K. McElfresh, having Ser. No. 11/985,288, and filing date Nov. 13, 2007, (3) to a pending U.S. patent application entitled "Detecting Counterfeit Electronic Components Using EMI Telemetric Fingerprints," by Kenny C. Gross, Ramakrishna C. Dhanekula, and Andrew J. Lewis, having Ser. No. 11/974,788, and filing date Oct. 16, 2007, (4) to a pending U.S. patent application entitled "Method and Apparatus for Generating an EMI Fingerprint for a Computer System," by Kenny C. Gross, Aleksey M. Urmanov, and Ramakrishna C. Dhanekula, having Ser. No. 11/787,027, and filing date Apr. 12, 2007, and (5) to a pending U.S. patent application entitled "Using EMI Signals to Facilitate Proactive Fault Monitoring in Computer Systems," by Kenny C. Gross, Aleksey M. Urmanov, Ramakrishna C. Dhanekula, and Steven F. Zwinger, having Ser. No. 11/787,003, and filing date Apr. 12, 2007. The above-listed applications are hereby incorporated by reference.

BACKGROUND

1. Field of the Invention

The present invention relates to circuit boards and techniques for monitoring a computer system. More specifically, the present invention relates to monitoring of electromagnetic-interference (EMI) signals using integrated antennas to determine a condition associated with the computer system.

2. Related Art

As electronic commerce grows increasingly more prevalent, business are increasingly relying on enterprise computing systems to process ever-larger volumes of electronic transactions. A failure of one of these enterprise computing systems can be disastrous, potentially resulting in millions of dollars in lost business. More importantly, a failure can seriously undermine consumer confidence in a business, making customers less likely to purchase goods and services from the business. Hence, it is critically important to ensure high availability of such enterprise computing systems.

To achieve high availability of enterprise computing systems it is often necessary to proactively monitor system performance to capture unambiguous diagnostic information that can quickly pinpoint sources of problems.

Ideally, this monitoring can facilitate detection of: changes in electronic components (including degradation of physical sensors associated with the electronic components), counterfeit electronic components, and/or changes associated with tampering with the electronic components. Unfortunately, existing techniques, such as visual inspection, are often unable to detect these changes.

Hence, there is a need to provide other techniques for monitoring electronic components in a computer system.

SUMMARY

One embodiment of the present invention provides a system that determines a condition associated with an integrated circuit disposed on a circuit board. During operation, the system receives electromagnetic-interference (EMI) signals from one or more antennas while the integrated circuit is operating, where the one or more antennas are disposed on the circuit board. Then, the system analyzes the received EMI signals to determine the condition.

In some embodiments, the analysis involves: using a fast Fourier transform (FFT) to convert the received EMI signals to the frequency domain; converting the output of the FFT into time-series frequency signals for different frequencies; and analyzing the time-series frequency signals to determine the condition.

Note that the condition may be determined by performing pattern-recognition analysis on the time-series frequency signals using a non-linear, non-parametric regression technique, such as a multivariate state estimation technique (MSET).

In some embodiments, determining the condition facilitates proactively detecting tampering or degradation anomalies during operation of the integrated circuit. Moreover, the tampering or degradation anomalies may be detected by comparing the received EMI signals with an inferential model that provides estimates of EMI signals during normal operation of the integrated circuit.

In some embodiments, the system executes a sequence of operations on a processor disposed on the integrated circuit prior to receiving the EMI signals, where the condition includes an EMI fingerprint associated with the sequence of operations for the integrated circuit. Then, the system may use the EMI fingerprint to determine whether the integrated circuit has been tampered with.

In some embodiments, the system receives telemetry signals for a physical variable which are collected by one or more physical sensors disposed on the integrated circuit. Next, the system may build an inferential model for the physical variable by correlating the received EMI signals with the telemetry signals, where the received EMI signals are associated with the integrated circuit. Moreover, the system may use the inferential model to determine the condition based on the received EMI signals, where the condition includes values of the physical variable. For example, the physical variable may be a local temperature on the integrated circuit and the one or more physical sensors may be temperature sensors.

In some embodiments, the condition includes the onset of metal whisker growth in a target area of the integrated circuit that is proximate to at least one of the antennas. Moreover, prior to receiving the EMI signals, the system may collect reference EMI signals using another one of the antennas which is positioned in the vicinity of a reference area of the integrated circuit that is free of metal whiskers. Then, the system may generate a reference EMI fingerprint from the reference EMI signals. Next, the system may build an inferential model based on the reference EMI fingerprint which facilitates determining the condition.

In some embodiments, determining the condition can involve comparing another EMI fingerprint for the integrated circuit with another reference EMI fingerprint to determine whether the integrated circuit includes a counterfeit component. Moreover, the other reference EMI fingerprint may be associated with a certified authentic reference integrated circuit of the same type as the integrated circuit.

In some embodiments, the EMI signals are received from a given antenna in the one or more antennas using a detector. Moreover, a multiplexer may facilitate selectively coupling the detector to the given antenna.

Note that a given antenna in the one or more antennas may include a metal trace having a length that is different than that for other antennas. Furthermore, in some embodiments the EMI signals are associated with a set of predetermined wavelengths.

Another embodiment provides a method including at least some of the above-described operations.

Another embodiment provides a computer-program product that facilitates the above-described operations on the system.

Another embodiment provides a computer system that includes the circuit board which includes the one or more antennas and the integrated circuit, and which is configured to perform at least some of the above-described operations.

Another embodiment provides the circuit board that includes the integrated circuit and the one or more antennas which are configured to receive EMI signals associated with the integrated circuit while the integrated circuit is operating. Moreover, an electronic component on the circuit board (such as a processor) is configured to analyze the received EMI signals to determine the condition associated with the integrated circuit.

BRIEF DESCRIPTION OF THE FIGURES

Note that like reference numerals refer to corresponding parts throughout the drawings.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Embodiments of a system (such as a computer system), a method, a computer-program product (i.e., software) for use with the system, and a circuit board that includes one or more integrated circuits and one or more antennas are described. These devices, systems and processes may be used to receive EMI signals from the one or more integrated circuits using the one or more antennas while the one or more integrated circuits are operating. For example, one of the integrated circuits may include a processor that executes a sequence of operations prior to and/or while the EMI signals are received. Then, the received EMI signals may be analyzed to determine a condition associated with one of the integrated circuits. This condition may facilitate: proactively detecting tampering or degradation anomalies during operation of one or more of the integrated circuits; determining values of a physical variable (such as temperature) associated with one or more physical sensors disposed on one or more of the integrated circuits, which may be used to determine if one or more of the physical sensors has changed or is failing; detecting the onset of metal whisker growth in a target area of at least one of the integrated circuits that is proximate to at least one of the antennas; and/or determining whether one or more of the integrated circuits include a counterfeit component.

In some embodiments, the analysis involves using a fast Fourier transform (FFT) to convert the received EMI signals to the frequency domain. Then, the output of the FFT may be converted into time-series frequency signals for different frequencies. Moreover, the time-series frequency signals may be analyzed to determine the condition. For example, the condition may be determined by performing pattern-recognition analysis on the time-series frequency signals using a non-linear, non-parametric regression technique, such as a multivariate state estimation technique (MSET).

By receiving and analyzing EMI signals associated with the one or more integrated circuits, the quality, reliability, availability, and/or serviceability of the one or more integrated circuits (and more generally, of one or more electronic components), as well as the computer system that includes these components, may be monitored and improved. For example, if a change associated with an impending failure is detected, corrective action can be taken. Therefore, these techniques may reduce operating costs of a wide variety of computer systems, including: servers, laptop computers, personal computers, work stations, mainframe computers, a digital signal processor, a portable-computing device, a personal organizer, a device controller, a computational engine within an appliance, as well as those computer systems that utilize symmetric multiprocessing (SMP) and/or multiprocessor system on-chip (MPSoC) architectures.

Moreover, by integrating the one or more antennas onto the circuit board the quality and reproducibility of the received EMI signals may be increased. In particular, the position of the integrated antennas relative to the one or more integrated circuits is constant, thereby reducing or eliminating errors associated with spacing and/or orientation variations. In addition, integrated antennas and detection circuits allow the EMI signals to be measured routinely (for example, as needed or after an elapsed time interval) and/or continuously.

Note that the term MSET as used in this specification refers to a class of pattern-recognition techniques. For example, see [Gribok] "Use of Kernel Based Techniques for Sensor Validation in Nuclear Power Plants," by Andrei V. Gribok, J. Wesley Hines, and Robert E. Uhrig, The Third American Nuclear Society International Topical Meeting on Nuclear Plant Instrumentation and Control and Human-Machine Interface Technologies, Washington, D.C., Nov. 13-17, 2000. This paper outlines several different pattern-recognition approaches. Hence, the term MSET as used in this specification can refer to (among other things) any technique outlined in [Gribok], including: ordinary least squares (OLS), support vector machines (SVM), artificial neural networks (ANNs), MSET, or regularized MSET (RMSET).

Additionally, note that the computer system may be at one location or may be distributed over multiple, geographically dispersed locations. Consequently, instructions and/or data associated with processes or jobs that are executed by the computer system may be received and communicated within the computer system over a network, such as: the Internet or World Wide Web (WWW), an intranet, a local area network (LAN) (such as IEEE 802.11 or WiFi), a wide area network (WAN) (such as IEEE 802.16 or WiMAX), a metropolitan area network (MAN), a satellite network, a wireless network (such as a cellular telephone network), an optical network, and/or a combination of networks or other technology enabling communication between computing systems or electronic devices.

We now describe embodiments of a computer system, a circuit board, a method, and software for determining a condition associated with an integrated circuit disposed on the circuit board. EMI signals are generated by computer systems during operation. These EMI signals are commonly regarded as noise, and computer systems are often shielded to minimize the amount of EMI signals emitted by the computer system. However, these EMI signals can also carry information about the computer system, which can be used for a variety of purposes, such as: proactive fault monitoring, detecting counterfeit components, identifying sensor changes or failures (for example, by correlating the EMI signals with telemetry signals from the sensor), and/or determining if a component has been tampered with or has degraded (for example, if a metal whisker is growing in a target area). In the discussion that follows, these purposes are collectively referred to as a state or 'condition' of one or more electronic components (such as one or more integrated circuits) in the computer system.

One challenge associated with measuring EMI signals is consistency. In particular, it can be difficult to obtain reproducible results when EMI signals are measured using external antennas or antenna probes, for example, because of different spacings and/or orientations during different measurements. Moreover, these variations can make it difficult to compare reference information, such as comparing an EMI fingerprint associated with an electronic component that is obtained during normal operation with an EMI fingerprint associated with current EMI-signal measurements to determine the condition.

Figure 1:
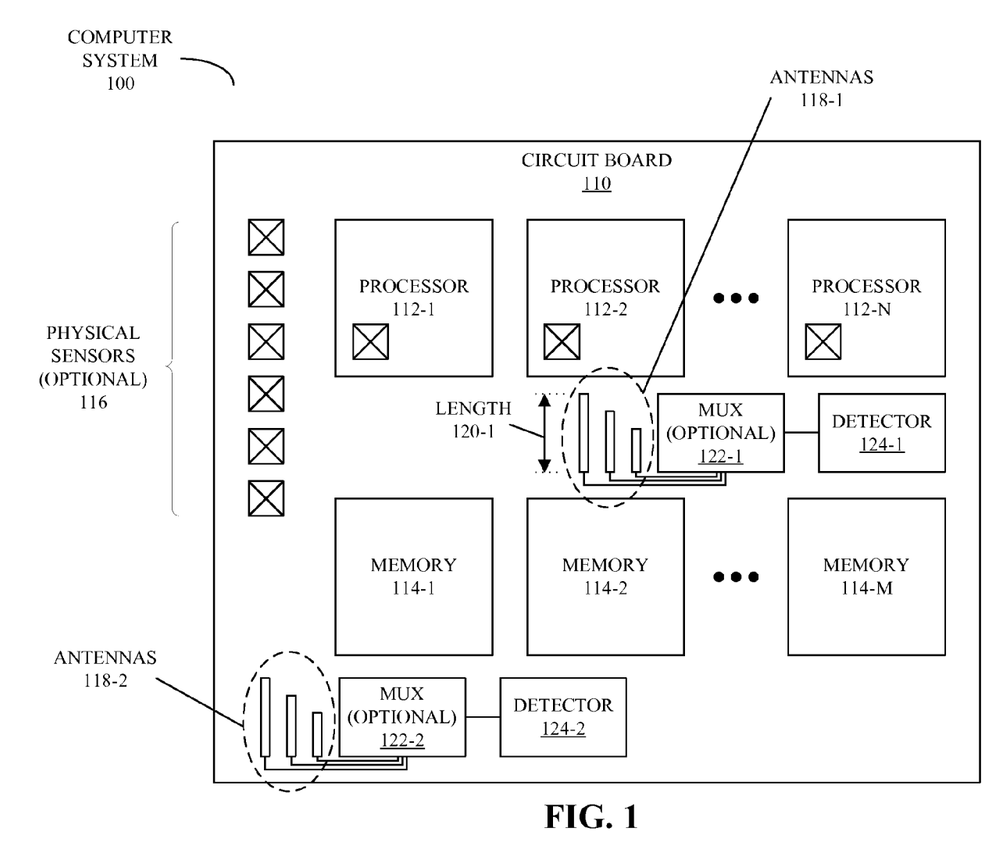
FIG. 1 is a block diagram illustrating a computer system in accordance with an embodiment of the present invention.

To address the challenges, in some embodiments one or more antennas are integrated into the computer system, for example, on a circuit board. This is shown in FIG. 1, which presents a block diagram illustrating a computer system 100. In particular, computer system 100 includes a circuit board 110, which includes multiple electronic components, such as processors 112 and/or memory 114 (and more generally, integrated circuits). Moreover, circuit board 110 may include one or more antennas 118 and one or more detectors 124 which receive and/or amplify EMI signals associated with one or more of the electronic components, such as the processors 112, while the one or more electronic components are operating. Additionally, in some embodiments one or more multiplexers (MUXs) 122 facilitate selective coupling of the detectors 124 to the antennas 118.

Note that the one or more detectors 124 and/or one or more of the processors 112 may analyze the received EMI signals to determine the condition associated with the one or more electronic components. Alternatively, the analysis may be performed by another electronic component in the computer system 100 and/or externally to the computer system 100.

In an exemplary embodiment, the antennas 118 include metal traces. More generally, the antennas 118 can include any type of antenna, such as: a dipole antenna, a Yagi-Uda antenna, a loop antenna, an electrical short antenna (e.g., an open-ended wire less than a quarter wavelength), a fractal antenna, a parabolic antenna, a microstrip antenna, a quad antenna, a random wire antenna (e.g., an open-ended wire greater than one wavelength), a beverage antenna, a helical antenna, a phased-array antenna, and/or any other type of antenna now known or later developed.

Moreover, circuit board 110 may include multiple groups of antennas, such as antennas 118-1 and antennas 118-2. For example, a given group of antennas may include three antennas that are arranged parallel to each other. However, in some embodiments a single, fixed-length antenna on circuit board 110 can be used to measure the EMI signals, which are then analyzed to determine the condition.

Note that the antennas in a given group of antennas may have different lengths, such as length 120-1, which correspond to a set of predetermined wavelengths. These predetermined wavelengths may be determined based on: an amount of crosstalk, interference, a signal-to-noise ratio, and/or the ability to accurately determine the condition.

Antennas 118 may be positioned proximate to the one or more electronic components on the circuit board 110 to facilitate measurements of the EMI signals, and thus, to facilitate determination of the condition. For example, an antenna may be placed a specified distance from one of the processors 112 (or a processor core in a multi-core processor) or from a target area where whisker growth is possible. However, because of space constraints on many circuit boards, in some embodiments the antennas 118 are positioned at available locations on the circuit board 110 and/or on another circuit board (not shown) that is separate from and proximate to the circuit board 110.

Additionally, in an exemplary embodiment the detectors 124 include radio-frequency demodulation units. For example, the detectors 124 may include: amplitude-modulation radio receivers and/or frequency-modulation radio receivers. Note that the detectors 124 may be simple and inexpensive, such as a phase-locked-loop (PLL) circuit demodulator. Moreover, the output from the detectors 124 may include digitized amplitudes versus time for frequencies that correspond to the predetermined wavelengths.

In some embodiments, the computer system 100 includes continuous-telemetry monitoring, for example, via optional physical sensors 116. For example, some of these optional physical sensors 116 may be included on the circuit board 110 and/or on one or more of the integrated circuits, such as the processors 112. This continuous-telemetry monitoring (which is described further below with reference to FIG. 2) may be used to measure one or more physical variables and/or additional parameters (such as performance metrics) of the computer system 100. In some embodiments, the optional physical sensors 116 include thermal sensors (such as thermocouples or ring oscillators), which measure temperature in the computer system 100.

Note that in some embodiments computer system 100 includes fewer or additional components. Moreover, two or more components may be combined into a single component and/or a position of one or more components may be changed.

Figure 2:
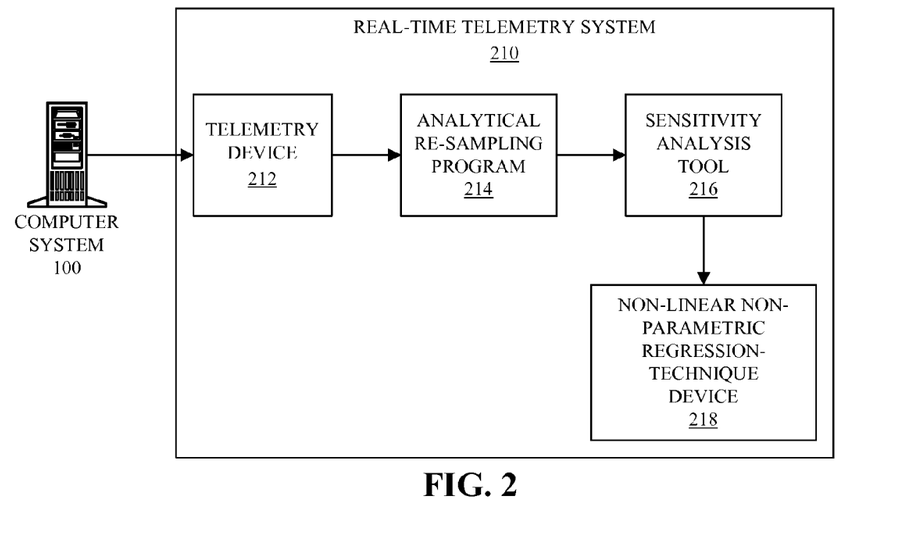
FIG. 2 is a block diagram illustrating a real-time telemetry system in accordance with an embodiment of the present invention.

We now discuss embodiments of a continuous-telemetry-monitoring system. FIG. 2 presents a block diagram of a real-time telemetry system 210 which monitors computer system 100. This real-time telemetry system includes: telemetry device 212, analytical re-sampling program 214, sensitivity analysis tool 216, and/or non-linear, non-parametric (NLNP) regression-technique device 218.

Telemetry device 212 gathers information (such as EMI signals, and more generally, telemetry signals) from various sensors and monitoring tools within computer system 100 in real-time during operation of computer system 100. In some embodiments, measurements are performed: as needed, continuously, or when driven by an event (such as an interrupt). Note that the information gathered can include telemetry signals associated with internal performance parameters maintained by software within the computer system 100. For example, these internal performance parameters can include: system throughput, transaction latencies, queue lengths, load on one or more processors or processor cores, load on the memory, load on the cache, I/O traffic, bus saturation metrics, FIFO overflow statistics, and various operational profiles gathered through 'virtual sensors' located within the operating system.

Moreover, the information can include telemetry signals associated with canary performance parameters for synthetic user transactions, which are periodically generated for the purpose of measuring quality of service from the end user's perspective. Additionally, the information may include hardware or physical variables, including, but not limited to: distributed internal temperatures, environmental variables (such as relative humidity, cumulative or differential vibrations within the computer system 100, fan speed, acoustic signals, current noise, voltage noise, and/or time-domain reflectometry readings), and/or energy consumption (such as currents and voltages).

Then, real-time telemetry system 210 directs the telemetry signals to local or remote locations that contain analytical re-sampling program 214, sensitivity analysis tool 216, and NLNP regression-technique device 218. In some embodiments, analytical re-sampling program 214, sensitivity analysis tool 216, and NLNP regression-technique device 218 are located within computer system 100. However, in other embodiments analytical re-sampling program 214, sensitivity analysis tool 216, and NLNP regression-technique device 218 are located on a plurality of computer systems including computer system 100 and/or other remote computer systems.

Note that analytical re-sampling program 214 ensures that the telemetry signals have a uniform sampling rate. In doing so, analytical re-sampling program 214 may use interpolation techniques, if necessary, to fill in missing data points, or to equalize the sampling intervals when the raw data is non-uniformly sampled.

After the telemetry signals pass through analytical re-sampling program 214, they may be aligned and correlated by sensitivity analysis tool 216. For example, in some embodiments sensitivity analysis tool 216 uses a moving window technique that 'slides' through the telemetry signals with systematically varying window widths. These sliding windows systematically vary the alignment between windows for different telemetry signals to optimize the degree of association between the telemetry signals, as quantified by an 'F-statistic,' which is computed and ranked for all telemetry signal windows by sensitivity analysis tool 216.

For statistically comparing the quality of two fits, F-statistics reveal the measure of regression. In particular, the higher the value of the F-statistic, the better the correlation is between two telemetry signals. In some embodiments, the lead/lag value for the sliding window that results in the F-statistic with the highest value is chosen, and the candidate telemetry signal is aligned to maximize this value. This process may be repeated for each telemetry signal by sensitivity analysis tool 216.

Note that telemetry signals that have an F-statistic very close to 1 are 'completely correlated' and can be discarded. This may occur when two telemetry signals are measuring the same metric, but express them in different engineering units. For example, a telemetry signal can convey a temperature in Fahrenheit, while another telemetry signal may convey the same temperature in Centigrade. Since these two telemetry signals are perfectly correlated, one does not contain any additional information over the other, and therefore, one may be discarded.

Moreover, some telemetry signals may exhibit little correlation, or no correlation whatsoever. In this case, these telemetry signals may be dropped as they add little predictive value. Once a highly correlated subset of the telemetry signals has been determined, they may be combined into one group or cluster for processing by the NLNP regression-technique device 218. In particular, as described further below, NLNP regression-technique device 218 may determine one or more inferential models based on this subset of the telemetry signals, such as inferential models that associate EMI signals with the proper function of the computer system 100 and/or the proper function of electronic components in the computer system 100. Note that the one or more inferential models may be determined during a training mode and/or in real time as the telemetry signals are collected.

In some embodiments, real-time telemetry system 210 includes fewer or additional components. Moreover, two or more components may be combined into a single component and/or a position of one or more components may be changed.

Figure 3A:
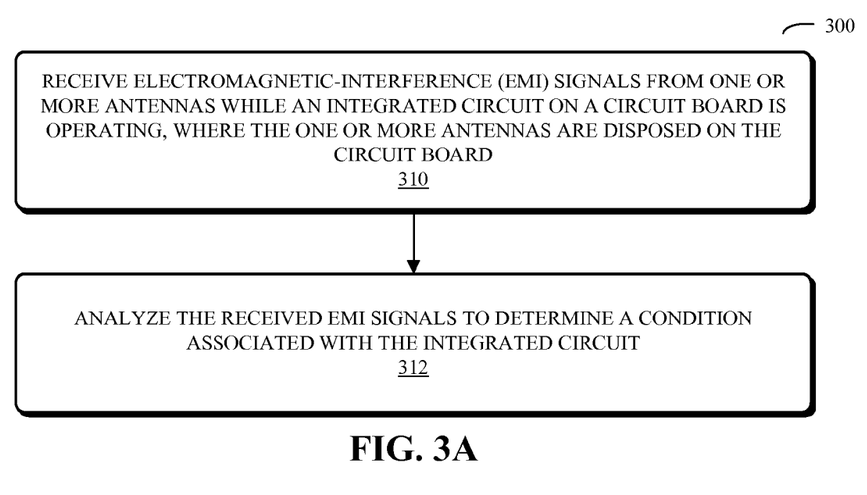
FIG. 3A is a flowchart illustrating a process for determining a condition associated with an integrated circuit disposed on a circuit board in accordance with an embodiment of the present invention.

We now discuss methods for determining a condition associated with an integrated circuit disposed on the circuit board. FIG. 3A presents a flowchart illustrating a process 300 for determining a condition associated with an integrated circuit disposed on a circuit board, which may be implemented by a system, such as a computer system. During operation, the system may receive electromagnetic-interference (EMI) signals from one or more antennas while the integrated circuit on the circuit board is operating (310), where the one or more antennas are disposed on the circuit board. Then, the system may analyze the received EMI signals to determine the condition (312).

Figure 3B:
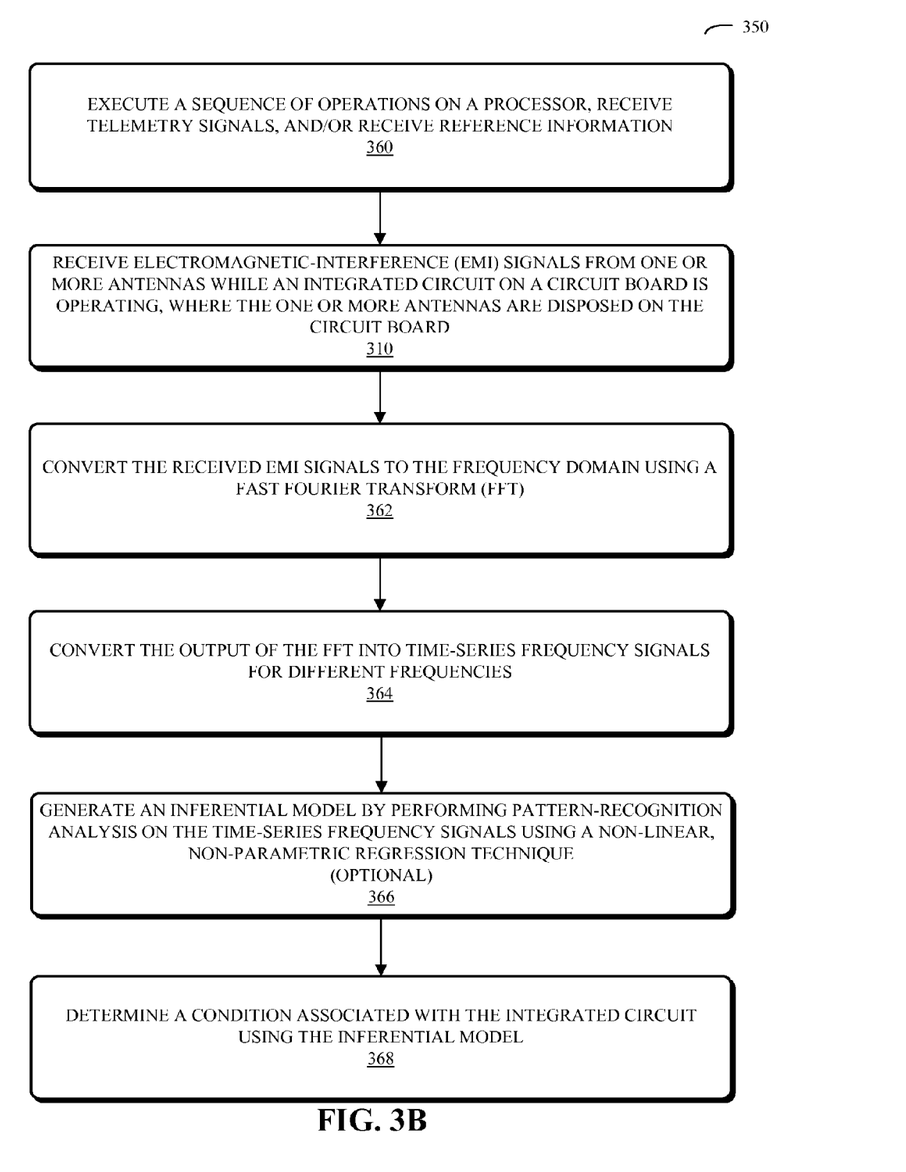
FIG. 3B is a flowchart illustrating a process for determining a condition associated with an integrated circuit disposed on a circuit board in accordance with an embodiment of the present invention.

FIG. 3B presents a flowchart illustrating a process 350 for determining a condition associated with an integrated circuit disposed on a circuit board, which may be implemented by a system, such as a computer system. During operation, the system may: execute a sequence of operations on a processor (such as a load script), receive telemetry signals, and/or receive reference information (360). For example, a load script can include: a sequence of instructions that produces a load profile that oscillates between specified processor utilization percentages; and/or a sequence of instructions that produces a customized load profile. As described further below, a customized load profile can be used to produce a unique EMI fingerprint which is difficult to spoof. In some embodiments, the load script is a dynamic load script which changes the load on the processor as a function of time.

Then, the system may receive electromagnetic-interference (EMI) signals from one or more antennas while the integrated circuit on the circuit board is operating (310), where the one or more antennas are disposed on the circuit board.

Next, the system may convert the received EMI signals to the frequency domain using a fast Fourier transform (FFT) (362) (or more generally, spectrum analysis), and may convert the output of the FFT into time-series frequency signals for different frequencies (364). For example, the received EMI signals may be: sampled at predetermined time intervals (such as once every second or every minute); each of the sampled EMI signal intervals may be transformed into the frequency domain; and an amplitude-time pair may be extracted for each of the different frequencies for each time interval. Note that the different frequencies can include: a frequency window bounded by a specified maximum frequency and a specified minimum frequency; a series of frequencies in frequency bins (which may be equally spaced); and/or a specified set of frequencies.

Moreover, the system may optionally generate an inferential model by performing pattern-recognition analysis on the time-series frequency signals using a non-linear, non-parametric regression technique (366). Additionally, the system may determine a condition associated with the integrated circuit using the inferential model (368).

Note that in some embodiments of processes 300 (FIG. 3A) and/or 350 there may be additional or fewer operations. For example, transformations other than the FFT may be used during operation 362, such as: a Laplace transform, a discrete Fourier transform, a Z-transform, and/or any other transform technique now known or later developed. Moreover, the order of the operations may be changed and/or two or more operations may be combined into a single operation. Additionally, the preceding operations may be implemented using hardware and/or software, as is known in the art.

In an exemplary embodiment, determining the condition facilitates proactively detecting tampering or degradation anomalies during operation of the integrated circuit. For example, the received EMI signals (or the associated time-series frequency signals) may be used to determine an EMI fingerprint associated with the sequence of operations for the integrated circuit. Then, the system may use the EMI fingerprint to determine whether the integrated circuit has been tampered with, such as when a spy chip or a piggy-back semiconductor chip is coupled to a processor to obtain information from a computer system.

In particular, the tampering or degradation anomalies may be detected by comparing the received EMI signals (or the associated time-series frequency signals) with an inferential model that provides estimates of EMI signals (or estimates of the time-series frequency signals) during normal operation of the integrated circuit. Note that this inferential model may include additional telemetry signals (other than the received EMI signals) that are correlated with the received EMI signals, such as those associated with: internal performance parameters, canary performance parameters, and/or physical variables. In some embodiments, the comparison of the received EMI signals and the estimated EMI signals uses a sequential detection technique, such as the sequential probability ratio test (SPRT).

In another exemplary embodiment, determining the condition facilitates proactive fault monitoring. For example, the system may build an inferential model for a physical variable by correlating the received EMI signals (or the associated time-series frequency signals) associated with the integrated circuit with received telemetry signals for the physical variable that are collected by one or more physical sensors disposed on the integrated circuit. This inferential model may be used to determine estimated values of the physical variable, such as an estimated local temperature on the integrated circuit. By comparing these estimated values to measurements performed using the one or more physical sensors (such as temperature sensors), changes, degradation and/or failure of the one or more physical sensors may be reproducibly determined with enhanced sensitivity and/or reduced false alarms. Moreover, by identifying sensors that are in error, the sensor may be replaced and/or the estimated values may be used to reduce dispersion in the measured values. More generally, the received EMI signals and the inferential model may proactively detect faults in a wide variety of electronic components in a computer system.

In another exemplary embodiment, determining the condition facilitates detecting the onset of metal whisker growth in a target area of the integrated circuit that is proximate to at least one of the antennas. Metal whiskers, such as needle-like conductive tin crystals, can occur in circuits that eliminate or reduce the amount of lead in solder and contact plating in order to reduce potential environmental impact. Note that metal whisker formation and growth can potentially cause current leakage or electrical shorting between: adjacent leads of a component, between leads of adjacent components on a circuit board, and/or between leads of a component and the traces on the circuit board.

In principle, metal whiskers can potentially grow from any area containing an exposed conductive surface. Consequently, the target area may include a location or a region associated with one or multiple electronic components known to be prone to the growth of metal whiskers and/or to failures/problems caused by metal whiskers.

In order to detect the onset of metal whisker growth in the target area, in some embodiments the system may collect reference EMI signals (i.e., reference information) prior to receiving the EMI signals using another one of the antennas which is positioned in the vicinity of a reference area of the integrated circuit that is free of metal whiskers (for example, antennas 118-2 in FIG. 1). Then, the system may generate a reference EMI fingerprint from the reference EMI signals (for example, using a pattern-recognition technique). In particular, in some embodiments the system computes cross-correlations between pairs of EMI time-series frequency signals associated with pairs of representative frequencies, and then computes an average correlation coefficient for each of the multiple representative frequencies. Based on the highest average correlation coefficients, the system may rank and select a subset of N representative frequencies (for example, N may be 20). Note that the time-series frequency signals associated with these N frequencies are the most highly correlated with other time-series. Once the subset of frequencies has been selected, the system may generate the reference EMI fingerprint using the EMI time-series frequency signals associated with the selected frequencies.

Next, the system may build an inferential model based on the reference EMI fingerprint which facilitates determining the condition. This inferential model may be used to provide an estimated EMI fingerprint based on a current EMI fingerprint that is determined from the received EMI signals (or the associated time-series frequency signals). Moreover, the estimated EMI fingerprint and the current EMI fingerprint may be compared to determine the condition, i.e., to detect the onset of metal whisker growth in the target area. In some embodiments, the inferential model provides estimates of the mean and the variance of the difference between the current EMI fingerprint and the estimated EMI fingerprint, which are used to determine the condition. Note that the comparison of the current EMI fingerprint and the estimated EMI fingerprint may use a sequential detection technique, such as the sequential probability ratio test (SPRT).

In yet another exemplary embodiment, determining the condition facilitates detecting of counterfeit components. In particular, the condition may include an EMI fingerprint for the integrated circuit that can be compared to a reference EMI fingerprint to determine whether the integrated circuit includes a counterfeit component. Note that the reference EMI fingerprint may be associated with a certified authentic reference integrated circuit of the same type as the integrated circuit.

In particular, a given EMI fingerprint may be determined by computing cross-correlations between pairs of EMI time-series frequency signals associated with pairs of representative frequencies, and then computing an average correlation coefficient for each of the multiple representative frequencies. Based on the highest average correlation coefficients, the system may rank and select a subset of N representative frequencies (for example, N may be 20). Note that the time-series frequency signals associated with these N frequencies are the most highly correlated with other time-series. Once the subset of frequencies has been selected, the system may generate the given EMI fingerprint using the EMI time-series frequency signals associated with the selected frequencies.

Figure 4:
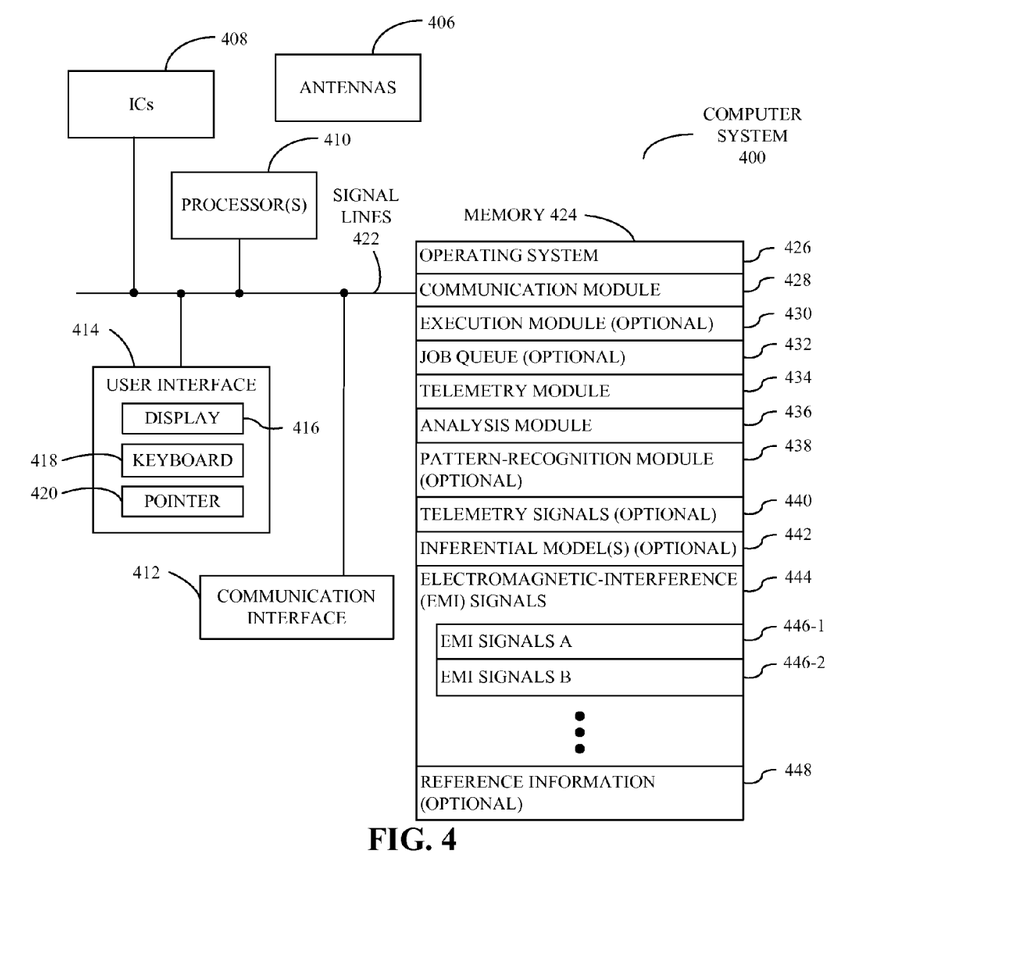
FIG. 4 is a block diagram illustrating a computer system in accordance with an embodiment of the present invention.

We now describe additional embodiments of a computer system. FIG. 4 presents a block diagram illustrating an embodiment of computer system 400, such as the computer system 100 (FIG. 1). Computer system 400 includes: one or more antennas 406, one or more ICs 408, one or more processors (or processor cores) 410, a communication interface 412, a user interface 414, and one or more signal lines 422 coupling these components together. Note that the one or more processors (or processor cores) 410 may support parallel processing and/or multi-threaded operation, the communication interface 412 may have a persistent communication connection, and the one or more signal lines 422 may constitute a communication bus. Moreover, the user interface 414 may include: a display 416, a keyboard 418, and/or a pointer 420, such as a mouse.

Memory 424 in the computer system 400 may include volatile memory and/or non-volatile memory. More specifically, memory 424 may include: ROM, RAM, EPROM, EEPROM, flash, one or more smart cards, one or more magnetic disc storage devices, and/or one or more optical storage devices. Memory 424 may store an operating system 426 that includes procedures (or a set of instructions) for handling various basic system services for performing hardware-dependent tasks. Moreover, memory 424 may also store communications procedures (or a set of instructions) in a communication module 428. These communication procedures may be used for communicating with one or more computers, devices and/or servers, including computers, devices and/or servers that are remotely located with respect to the computer system 400.

Memory 424 may also include one or more program modules (or a set of instructions), including: optional execution module 430 (or a set of instructions), telemetry module 434 (or a set of instructions), analysis module 436 (or a set of instructions), and/or optional pattern-recognition module 438 (or a set of instructions). During operation of the computer system 400, telemetry module 434 may measure EMI signals 444, such as EMI signals A 446-1 or EMI signals B 446-2, associated with one or more ICs 408, which may include the processors 410. As noted above, these measurements may be performed using one or more antennas 406 that are included on a circuit board (not shown) that includes the one or more ICs 408 or that is proximate to another circuit board (not shown) that includes the one or more ICs 408. Note that the EMI signals 444 may be associated with a set of predetermined wavelengths, which may improve a robustness of the measurements (for example, by reducing sensitivity to crosstalk or other interference signals).

In some embodiments, optional execution module 430 performs one or more processes, such as one or more of the jobs in optional job queue 432, either before and/or during the measurement of the EMI signals 444. In this way, EMI signals associated with a normal operation of the one or more ICs 408 and/or optional reference information 448 (such as one or more EMI fingerprints of the one or more integrated circuits) may be determined. For example, the one or more EMI fingerprints may include: reference EMI signals associated with a certified authentic reference integrated circuit of the same type as one or more of the ICs 408, which can be used to detect counterfeit components; and/or reference EMI signals from one of the antennas 406 which is positioned in the vicinity of a reference area of one of the ICs 408 that is free of metal whiskers, which can be used to detect metal whisker growth in a target area of one of the ICs 408 that is proximate to at least one of the antennas 406.

After the EMI signals 444 are received, analysis module 436 may analyze the EMI signals 444 to determine a condition associated with one or more of the ICs 408, such as proactively detecting tampering or degradation anomalies during operation of one or more of the ICs 408, for example, based on a comparison with the EMI signals associated with normal operation of one or more of the ICs 408 and/or optional reference information 448. For example, analysis module 436 may use a fast Fourier transform (FFT) to convert the EMI signals 444 to the frequency domain, and then may convert the output of the FFT into time-series frequency signals for different frequencies.

Moreover, in some embodiments optional pattern-recognition module 438 performs pattern-recognition analysis on the time-series frequency signals using a non-linear, non-parametric regression technique, such as a multivariate state estimation technique (MSET). This pattern-recognition analysis may determine optional inferential models 442, which may be used, in conjunction with the EMI signals 444 and/or optional reference information 448, to determine the condition. For example, a given inferential model may provide estimates of EMI signals during normal operation of one of the ICs 408, which may allow changes or degradation (such as those associated with an impending failure) to be detected. Note that the optional inferential models 442 may be determined during a training mode (e.g., previously) or during a monitoring mode (e.g., while the condition is being determined or in real time).

In some embodiments, telemetry module 434 receives optional telemetry signals 440 for one or more physical variables which are collected by one or more physical sensors (such as optional physical sensors 116 in FIG. 1) disposed on one or more of the ICs 408. Moreover, optional pattern-recognition module 438 may determine one or more optional inferential models 442 for the one or more physical variables by correlating the EMI signals 444 with the optional telemetry signals 440. The one or more optional inferential models 442 may be used to determine estimated values of the one or more physical variables, such as local temperature values. By comparing the estimated values with recent measurements of the one or more physical variables, analysis module 436 may determine the condition, which in these embodiments may include a change or a failure of one or more of the physical sensors.

Instructions in the various modules in the memory 424 may be implemented in: a high-level procedural language, an object-oriented programming language, and/or in an assembly or machine language. The programming language may be compiled or interpreted, i.e., configurable or configured, to be executed by the one or more processors (or processor cores) 410.

Although the computer system 400 is illustrated as having a number of discrete components, FIG. 4 is intended to be a functional description of the various features that may be present in the computer system 400 rather than as a structural schematic of the embodiments described herein. In practice, and as recognized by those of ordinary skill in the art, the functions of the computer system 400 may be distributed over a large number of servers or computers, with various groups of the servers or computers performing particular subsets of the functions. In some embodiments, some or all of the functionality of the computer system 400 may be implemented in one or more application-specific integrated circuits (ASICs) and/or one or more digital signal processors (DSPs).

Computer system 400 may include fewer components or additional components. Moreover, two or more components may be combined into a single component and/or a position of one or more components may be changed. In some embodiments the functionality of computer system 400 may be implemented more in hardware and less in software, or less in hardware and more in software, as is known in the art.

Figure 5:
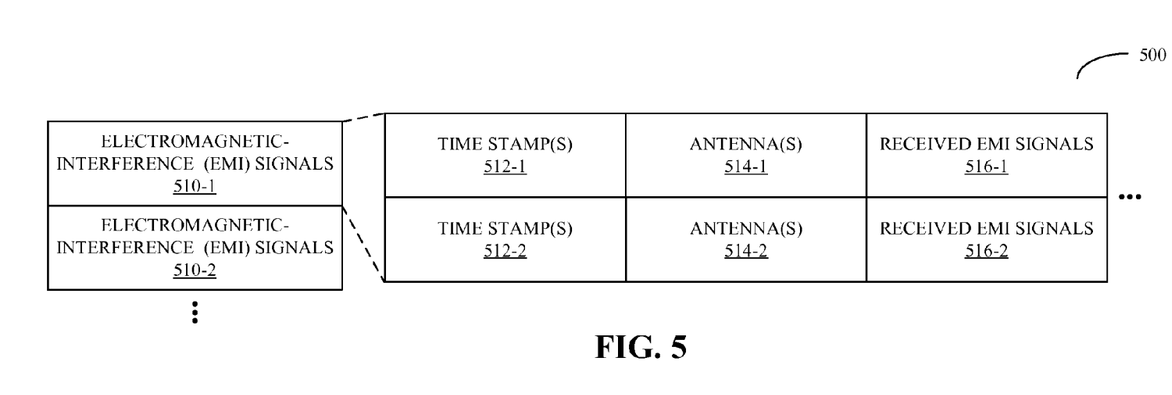
FIG. 5 is a block diagram illustrating a data structure in accordance with an embodiment of the present invention.

We now discuss data structures that may be used in the computer systems 100 (FIG. 1) and/or 400. FIG. 5 presents a block diagram illustrating an embodiment of a data structure. This data structure may include EMI signals 510. More specifically, a given instance of the EMI signals 510, such as EMI signals 510-1, may include multiple entries for: one or more time stamp(s) 512, one or more associated antennas 514, and/or received EMI signals 516.

Figure 6:
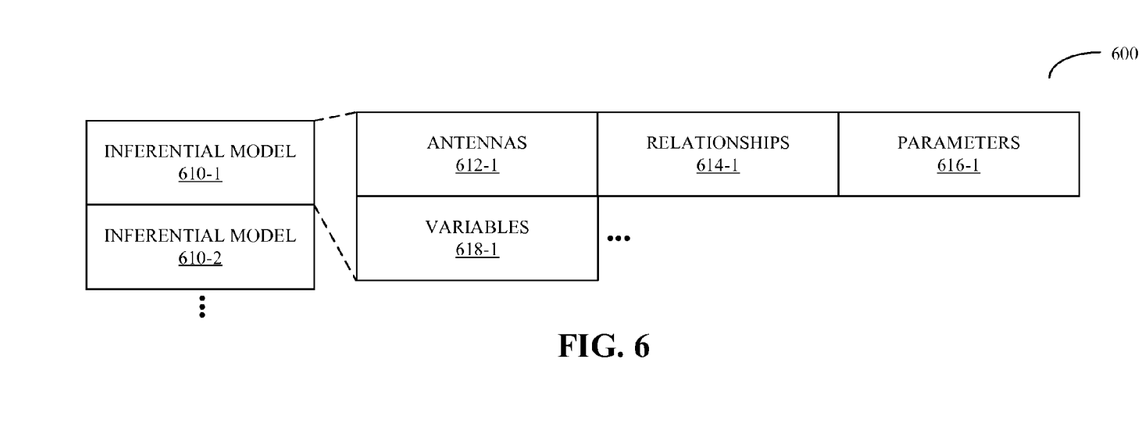
FIG. 6 is a block diagram illustrating a data structure in accordance with an embodiment of the present invention.

FIG. 6 presents a block diagram illustrating an embodiment of a data structure. This data structure may include inferential models 610. More specifically, a given instance of the inferential models 610, such as inferential model 610-1, may include: one or more associated antennas 612-1 and one or more relationships 614-1 between parameters 616-1 and variables 618-1.

Note that that in some embodiments of the data structures 500 (FIG. 5) and/or 600 there may be fewer or additional components. Moreover, two or more components may be combined into a single component and/or a position of one or more components may be changed.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for determining a condition associated with an integrated circuit disposed on a circuit board, comprising:
   receiving electromagnetic-interference (EMI) signals from one or more antennas while the integrated circuit on the circuit board is operating, wherein the one or more antennas are disposed on the circuit board, and wherein the antennas receive EMI signals generated from the integrated circuit while the integrated circuit is operating; and
   analyzing the received EMI signals to determine the condition, wherein the one or more antennas comprise at least two metal traces on the circuit board, wherein the at least two metal traces have different lengths, and wherein the different lengths correspond to a set of predetermined wavelengths that are determined based on an ability to accurately determine the condition.

2. The method of claim 1, wherein the analysis involves:
   using a fast Fourier transform (FFT) to convert the received EMI signals to the frequency domain;
   converting the output of the FFT into time-series frequency signals for different frequencies; and
   analyzing the time-series frequency signals to determine the condition.

3. The method of claim 2, wherein the condition is determined by performing pattern-recognition analysis on the time-series frequency signals using a non-linear, non-parametric regression technique.

4. The method of claim 2, wherein the condition is determined by performing pattern-recognition analysis on the time-series frequency signals using a multivariate state estimation technique (MSET).

5. The method of claim 1, wherein determining the condition facilitates proactively detecting tampering or degradation anomalies during operation of the integrated circuit.

6. The method of claim 5, wherein the tampering or degradation anomalies are detected by comparing the received EMI signals with an inferential model that provides estimates of EMI signals during normal operation of the integrated circuit.

7. The method of claim 1, further comprising executing a sequence of operations on a processor disposed on the integrated circuit prior to receiving the EMI signals, wherein the condition includes an EMI fingerprint associated with the sequence of operations for the integrated circuit.

8. The method of claim 7, further comprising using the EMI fingerprint to determine whether the integrated circuit has been tampered with.

9. The method of claim 1, further comprising:
   receiving telemetry signals for a physical variable which are collected by one or more physical sensors disposed on the integrated circuit;
   building an inferential model for the physical variable by correlating the received EMI signals with the telemetry signals, wherein the received EMI signals are associated with the integrated circuit; and
   using the inferential model to determine the condition based on the received EMI signals, wherein the condition includes values of the physical variable.

10. The method of claim 9, wherein the physical variable is a local temperature on the integrated circuit; and
    wherein the one or more physical sensors are temperature sensors.

11. The method of claim 1, wherein the condition includes the onset of metal whisker growth in a target area of the integrated circuit that is proximate to at least one of the antennas.

12. The method of claim 11, wherein, prior to receiving the EMI signals, the method further comprises:
    collecting reference EMI signals using another one of the antennas which is positioned in the vicinity of a reference area of the integrated circuit that is free of metal whiskers;
    generating a reference EMI fingerprint from the reference EMI signals; and
    building an inferential model based on the reference EMI fingerprint which facilitates determining of the condition.

13. The method of claim 1, wherein the condition includes an EMI fingerprint for the integrated circuit that can be compared to a reference EMI fingerprint to determine whether the integrated circuit includes a counterfeit component.

14. The method of claim 13, wherein the reference EMI fingerprint is associated with a certified authentic reference integrated circuit of the same type as the integrated circuit.

15. The method of claim 1, wherein the received EMI signals from a given antenna in the one or more antennas are received using a detector.

16. The method of claim 15, wherein a multiplexer facilitates selectively coupling the detector to the given antenna.

17. The method of claim 1, wherein the EMI signals are associated with a set of predetermined wavelengths.

18. A circuit board, comprising:
    an integrated circuit disposed on the circuit board; and one or more antennas disposed on the circuit board which are configured to receive electromagnetic-interference (EMI) signals associated with the integrated circuit while the integrated circuit is operating, wherein an electronic component on the circuit board is configured to analyze the received EMI signals to determine a condition associated with the integrated circuit, and wherein the antennas receive EMI signals generated from the integrated circuit while the integrated circuit is operating, wherein the one or more antennas comprise at least two metal traces on the circuit board, wherein the at least two metal traces have different lengths, and wherein the different lengths correspond to a set of predetermined wavelengths that are determined based on an ability to accurately determine the condition.

19. A computer system, comprising:

a circuit board including one or more antennas and an integrated circuit;

memory;

a program module, wherein the program module is stored in the memory and configured to be executed by a processor to determine a condition associated with the integrated circuit, the program module including:

instructions for receiving electromagnetic-interference (EMI) signals from the one or more antennas while the integrated circuit on the circuit board is operating, wherein the antennas receive EMI signals generated from the integrated circuit while the integrated circuit is operating; and instructions for analyzing the received EMI signals to determine the condition, wherein the one or more antennas comprise at least two metal traces on the circuit board, wherein the at least two metal traces have different lengths, and wherein the different lengths correspond to a set of predetermined wavelengths that are determined based on an ability to accurately determine the condition.

20. The method of claim 1, wherein the two metal traces are parallel to each other.

* * * * *